(12) United States Patent
Bharti et al.

(10) Patent No.: US 12,307,263 B2
(45) Date of Patent: May 20, 2025

(54) PROVISIONING BUSINESS FUNCTION ON EDGE

(71) Applicant: International Business Machines Corporation, Armonk, NY (US)

(72) Inventors: Harish Bharti, Pune (IN); Rajesh Kumar Saxena, Thane East (IN); Sandeep Sukhija, Rajasthan (IN); Deepak Bajaj, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 17/821,488

(22) Filed: Aug. 23, 2022

(65) Prior Publication Data

US 2024/0069926 A1 Feb. 29, 2024

(51) Int. Cl.
*G06F 9/445* (2018.01)
*G06F 21/60* (2013.01)

(52) U.S. Cl.
CPC ...... *G06F 9/44505* (2013.01); *G06F 9/44536* (2013.01); *G06F 21/602* (2013.01)

(58) Field of Classification Search
CPC ............. H04L 41/0895; H04L 41/5019; H04L 41/0897; H04L 41/40; H04L 41/5051; H04L 41/5054
See application file for complete search history.

(56) References Cited

U.S. PATENT DOCUMENTS

| | | | |
|---|---|---|---|
| 10,791,168 B1* | 9/2020 | Dilley | H04L 67/288 |
| 10,865,043 B1 | 12/2020 | Garcia et al. | |
| 11,936,757 B1* | 3/2024 | Benny | H04L 61/4511 |
| 2016/0357581 A1* | 12/2016 | Jiang | G06F 9/44526 |
| 2017/0206073 A1* | 7/2017 | Kirkpatrick | G06F 9/445 |
| 2017/0220335 A1* | 8/2017 | Pink | G06F 9/44536 |
| 2020/0229544 A1 | 7/2020 | Regan et al. | |
| 2020/0322225 A1 | 10/2020 | Alamouti et al. | |
| 2020/0379805 A1 | 12/2020 | Porter et al. | |
| 2021/0091994 A1* | 3/2021 | Meirosu | H04W 4/24 |
| 2021/0144517 A1* | 5/2021 | Guim Bernat | H04L 41/0869 |
| 2022/0086218 A1 | 3/2022 | Sabella et al. | |
| 2022/0116755 A1 | 4/2022 | Filippou et al. | |
| 2022/0159062 A1* | 5/2022 | Shen | H04L 67/025 |

(Continued)

FOREIGN PATENT DOCUMENTS

| | | |
|---|---|---|
| CN | 110883515 A | 3/2020 |
| CN | 111761347 A | 10/2020 |

(Continued)

OTHER PUBLICATIONS

Arteaga et al., "Multi-Variant Execution at the Edge," Feb. 23, 2022, 15 pages. https://arxiv.org/pdf/2108.08125.pdf.

(Continued)

*Primary Examiner* — Alex H. Tran
(74) *Attorney, Agent, or Firm* — Yee & Associates, P.C.

(57) ABSTRACT

Provisioning business functions is provided. A runtime binary activation code is sent to a nodal edge server that has a needed runtime binary for a set of edge devices to perform a business function. A secure shell protocol connection with root operating system access is established to the nodal edge server that has the needed runtime binary to execute the runtime binary activation code.

19 Claims, 5 Drawing Sheets

(56) References Cited

U.S. PATENT DOCUMENTS

2023/0168875 A1* 6/2023 Carter ................. G06F 8/71
717/174
2023/0336985 A1* 10/2023 Zisimopoulos ....... H04W 48/18

FOREIGN PATENT DOCUMENTS

| WO | 2021/097253 A1 | 5/2021 |
| WO | 2021/257974 A1 | 12/2021 |

OTHER PUBLICATIONS

CMCC. "Discussion on RAN support of edge computing in NR" 3GPP TSG-RAN WG2 Meeting #101 R2-1803210, Mar. 2, 2018, 05 Pages.

International Searching Authority, "Notification of Transmittal of the International Search Report and the Written Opinion of the International Searching Authority, or Declaration," Patent Cooperation Treaty, Sep. 7, 2023, 13 pages, International Application No.-PCT/CN2023/106969.

* cited by examiner

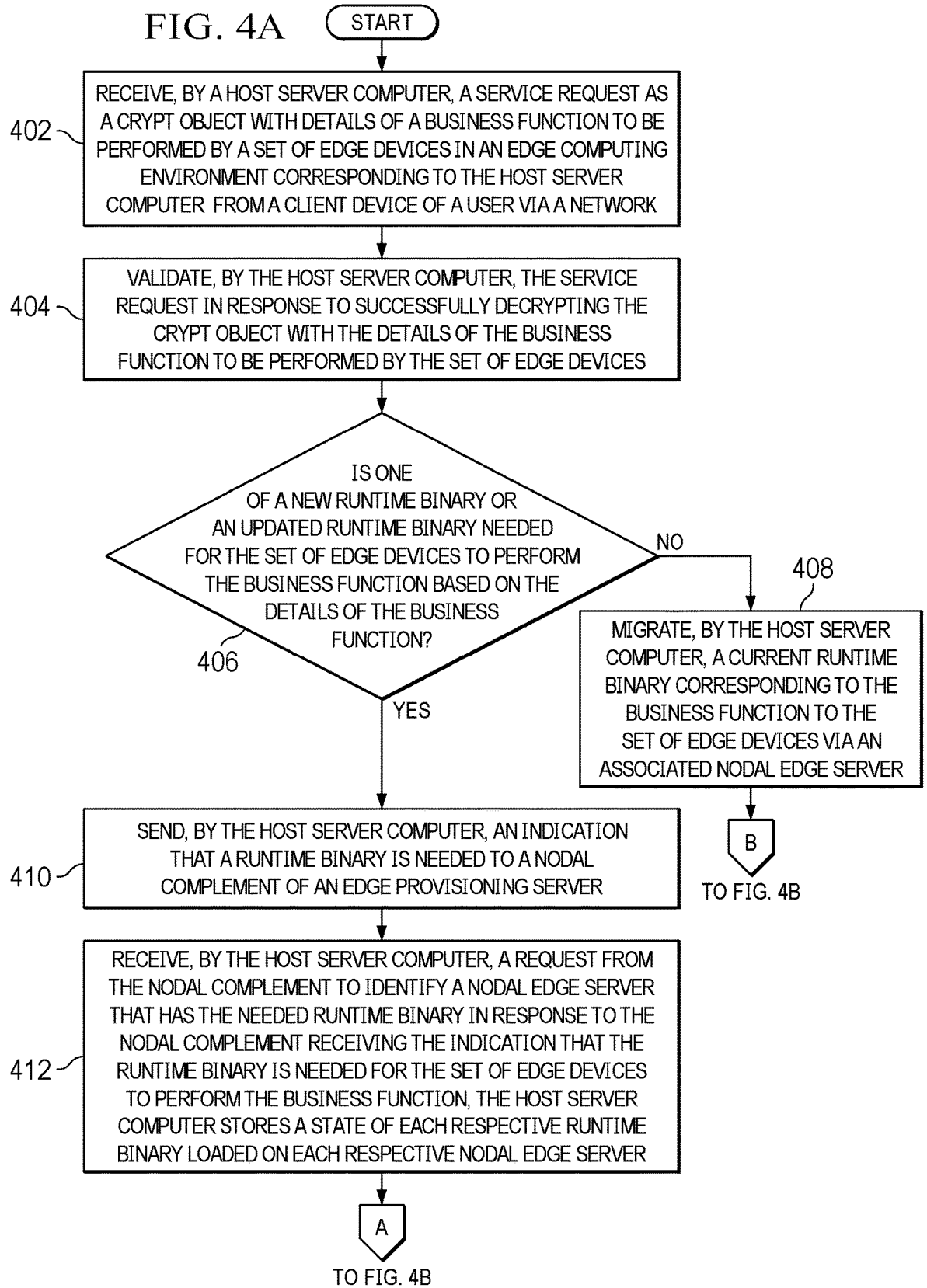

PROVISIONING BUSINESS FUNCTION ON EDGE

BACKGROUND

1. Field

The disclosure relates generally to edge computing and more specifically to provisioning and executing business functions in an edge computing environment by providing runtime binaries on the edge.

2. Description of the Related Art

Edge computing is a topology in a distributed computing environment where computation and data storage are bought closer to the location where they are needed. Therefore, instead of doing all computation and data storage on the cloud, the computation and data storage are done at the edge of the network. Specifically, the computation and data storage are done in devices or applications where real time data processing and storage are needed. In most cases, a consumer needs services from a service provider as per an agreed upon quality of service (e.g., a service level agreement). Communications service providers are embracing cloud and virtualization as these communications service providers deliver new fifth-generation (5G) and edge computing services that drive growth and improve customer experiences.

SUMMARY

According to one illustrative embodiment, a computer-implemented method for provisioning business functions is provided. A computer sends a runtime binary activation code to a nodal edge server that has a needed runtime binary for a set of edge devices to perform a business function. The computer establishes a secure shell protocol connection with root operating system access to the nodal edge server that has the needed runtime binary to execute the runtime binary activation code. According to other illustrative embodiments, a computer system and computer program product for provisioning business functions are provided.

BRIEF DESCRIPTION OF THE DRAWINGS

FIGS. 4A-4B are a flowchart illustrating a process for provisioning business functions in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
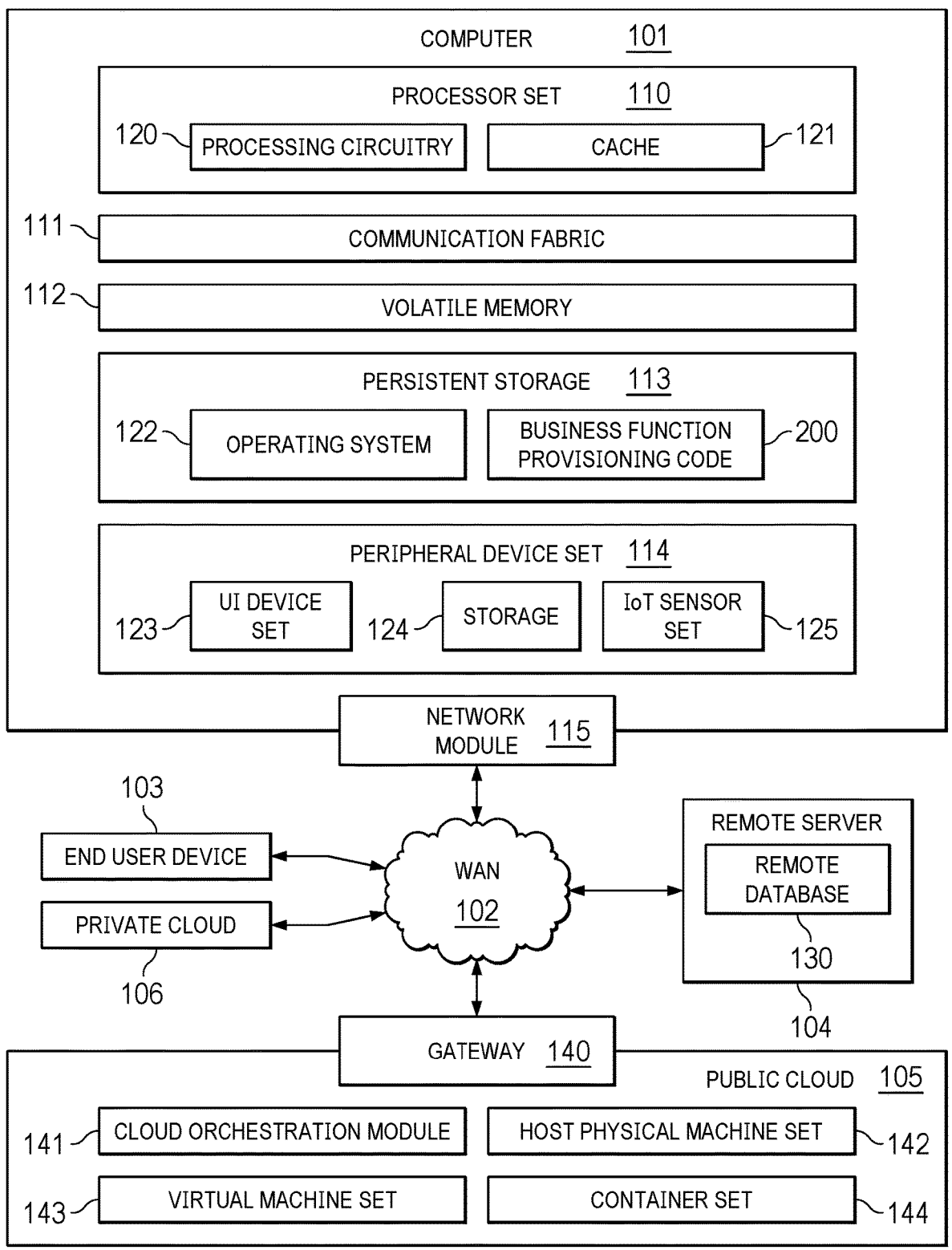
FIG. 1 is a pictorial representation of a computing environment in which illustrative embodiments may be implemented.
Figure 2:
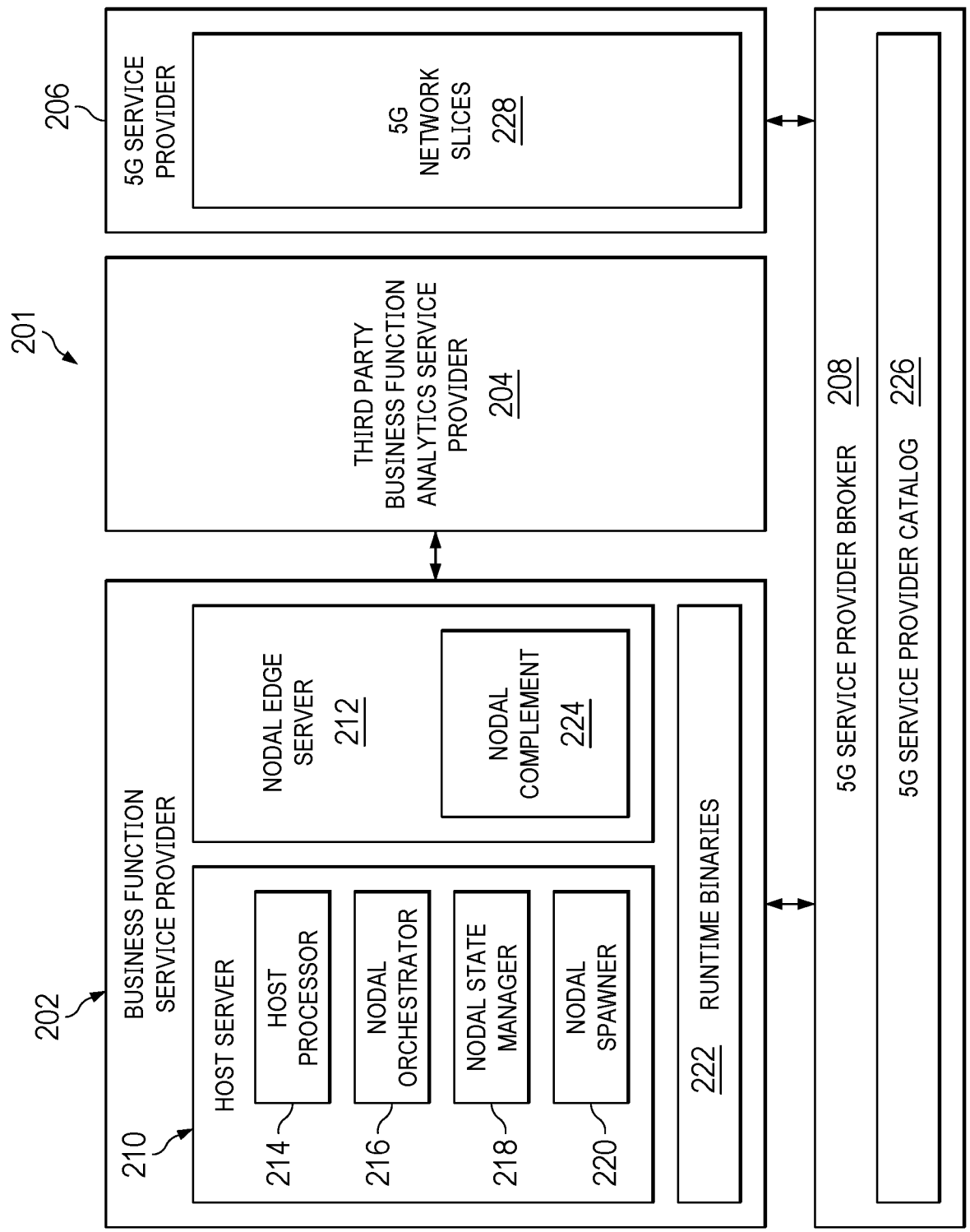
FIG. 2 is a diagram illustrating an example of a business function provisioning system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as business function provisioning code 200. For example, business function provisioning code 200 provisions and executes virtualized business functions on edge devices associated with nodal edge servers in an edge computing environment by providing runtime binaries to the edge devices via the associated nodal edge servers. In addition to business function provisioning code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and business function provisioning code block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in business function provisioning code block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The business function provisioning code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Currently, when a user requests a service that is outside the current network or within an internetworked scope, it is not straightforwardly possible to perform the service. Even if the service can be performed in such a scenario, the central host server that manages the service does not align with inherit edge computing benefits, which is driving the user's service request. As a result, this complicates the network by bringing everything within the network. However, illustrative embodiments provide a hybrid experience at the edge using the disclosed framework herein.

Illustrative embodiments provision and execute virtualized business functions on the edge (i.e., edge business functions) by providing lightweight runtime binaries on the edge. A runtime binary is a runtime configuration that obtains resources a set of edge devices needs to invoke a narrow band-based network slice of a 5G network and perform a corresponding business function. The set of edge devices, which will perform the business function, is associated with a nodal edge server. The nodal edge server corresponds to a central host server of the edge computing environment. Illustrative embodiments utilize the central host server to scale up needed runtime binaries on nodal edge servers on the fly in real time and scale down the runtime binaries on the nodal edge servers when edge devices finish or complete execution of corresponding business functions.

The nodal edge server sends a request for a narrow band-based network slice of the 5G network comprising a specified bandwidth over a specified time period (i.e., specified start and end times). In response to receiving the request from the nodal edge server, the central host server performs a runtime binary identification process to determine which runtime binary is needed by the set of edge devices associated with the nodal edge server and migrates the needed runtime binary to the nodal edge server. The nodal edge server then sends the needed runtime binary to the set of edge devices to invoke the narrow band-based network slice of the 5G network for the set of edge devices to perform the business function (e.g., automatically operate a set of irrigation systems on a set of farms over a specified time period and at a specified bandwidth). It should be noted that the set of edge devices are the only devices that are able to access the narrow band-based network slice of the 5G network provisioned for that particular business function. Of course, the business function may be any type of function associated with an ultra-low latency application that automatically performs a set of tasks or actions requested by the user from the service provider of that business function via the 5G network. Applications, such as, for example, smart factory applications, smart electrical grid applications, smart farming applications, augmented reality-assisted surgery applications, and the like, are categorized as ultra-low latency applications. Ultra-low latency applications perform fast processing of data and have a low tolerance for delay (i.e., network latency).

Illustrative embodiments utilize a 5G service provider broker or marketplace to select a geographically close 5G service provider to orchestrate business function services to meet user demand. The 5G service provider broker identifies an appropriate 5G service provider to provide the narrow band-based network slice of the 5G network for the edge devices to perform the business function based on, for example, proximity to the service request, cost, and the like. The central host server performs a provisioning process to obtain the narrow band-based network slice of the 5G network (i.e., the exact start time, end time, and bandwidth from the selected 5G service provider) for the set of edge devices to perform the business function. The selected 5G service provider ensures synchronous state of the set of edge devices is available at the edge. Based on permissible network latency defined by, for example, service level agreement, contract, or the like, the central host server configures the business function services at the nodal edge server. Illustrative embodiments are capable of generating nodal edge server instances, along with corresponding runtime binaries, and then removing the nodal edge server instances and their runtime binaries when business function transactions complete or finish.

The nodal edge server triggers requests for services that are available via the 5G service provider broker. The 5G service provider broker orchestrates the service requests and enables edge provisioned services. Thus, the 5G service provider broker establishes a brokering platform allowing service providers (e.g., business function service providers, 5G service providers, and the like) and other participants of business functions to interact.

The selected 5G service provider ensures availability at the edge of the nodal edge server location, as network latency can cause the ultra-low latency application to fail. This can be done when a host server identifies where and how the business function transaction is supported and the host server is able to provision the appropriate nodal edge server with a new or updated runtime binary to fulfill that business function transaction. This is to fulfil the specific response that is needed to satisfy a given business function transaction.

Illustrative embodiments ensure that a right-sized configuration of a nodal edge server instance with an up-to-date runtime binary is available to fulfill a corresponding business function transaction. Illustrative embodiments achieve this by automatically provisioning a runtime binary that has a set of services (e.g., resources) needed to support the business function transaction. If such a runtime binary is available regionally or in a zone geographically near the point of business function processing, then illustrative embodiments can clone that runtime binary or generate that runtime binary as a new instance.

In response to illustrative embodiments identifying the appropriate nodal edge server, illustrative embodiments either migrate the needed runtime binary to that particular nodal edge server from an edge provisioning server or clone the needed runtime binary from a geographically nearest nodal edge server in the same zone. Illustrative embodiments determine whether to migrate or clone the needed runtime binary based on initial and final configuration discrepancies (i.e., changes in the runtime binary that were needed for different edge devices in different locations to perform the business function) that initiated the migration of the runtime binary.

The central host server migrates the needed runtime binary to the nodal edge server from the edge provisioning server only when no geographically nearby nodal edge server in the same zone as the nodal edge server has the needed runtime binary that can be cloned on the nodal edge server. After identification of the 5G service provider during an activation process, the host server utilizes a nodal orchestrator component to determine whether a new or updated runtime binary is needed or not based on received details of the business function. The host server also utilizes a nodal state manager to store state information of all runtime binaries on all nodal edge servers. Based on initial and final runtime binary configuration states on a nodal edge server, illustrative embodiments perform either migration or cloning of the runtime binary on that nodal edge server.

Thus, illustrative embodiments provide one or more technical solutions that overcome a technical problem with users requesting business function services to be performed outside the current network on the edge. As a result, these one or more technical solutions provide a technical effect and practical application in the field of edge computing.

With reference now to FIG. 2, a diagram illustrating an example of a business function provisioning system is depicted in accordance with an illustrative embodiment. Business function provisioning system 201 may be implemented in a computing environment, such as computing environment 100 in FIG. 1. Business function provisioning system 201 is a system of hardware and software components for provisioning and executing business functions on edge devices associated with nodal edge servers by providing runtime binaries to the edge devices via the associated nodal edge servers.

In this example, business function provisioning system 201 includes business function service provider 202, third party business function analytics service provider 204, 5G service provider 206, and 5G service provider broker 208. However, it should be noted that business function provisioning system 201 is intended as an example only and not as a limitation on illustrative embodiments. In other words, business function provisioning system 201 may include any number of business function service providers, third party business function analytics service providers, 5G service providers, 5G service provider brokers, and other providers and components not shown.

Business function service provider 202 provides a set of services corresponding to business functions of ultra-low latency applications requested by customers via client devices, such as, for example, end user device 103 in FIG. 1. For example, business function service provider 202 may support a business function that automatically operates a set of irrigation systems (i.e., a set of edge devices) on a set of farms during a set of specified time intervals and at a specified bandwidth. Third party business function analytics service provider 204 provides analytics corresponding to the business functions supported by business function service provider 202. For example, third party business function analytics service provider 204 may provide business function service provider 202 with information regarding the irrigation system business function, such as air temperature, soil temperature, amount of soil moisture, amount of rainfall, amount of daylight, soil composition, vegetation growth rate, and the like.

5G service provider 206 provides the 5G network for business function service provider 202 to perform requested business functions corresponding to ultra-low latency applications. 5G service provider broker 208 selects an appropriate 5G service provider (e.g., 5G service provider 206) to provide the 5G network for performing the requested business functions. In other words, 5G service provider broker 208 is an interface between business function service provider 202 and 5G service provider 206.

In this example, business function service provider 202 includes host server 210 and nodal edge server 212. However, it should be noted that business function service provider 202 can include any number of host servers and nodal edge servers. Host server 210 is a central computer that controls and coordinates operations in a plurality of nodal edge servers, such as nodal edge server 212, of the edge computing environment.

In this example, host server 210 includes host processor 214, nodal orchestrator 216, nodal state manager 218, and nodal spawner 220. However, it should be noted that host server 210 can include more components than shown, such as, for example, a persistent writer, a persistent database, and the like.

Host server 210 utilizes host processor 214 to receive crypt objects corresponding to service requests that contain details of business function transactions requested by users (e.g., customers) to be performed. Host processor 214 decrypts the received crypt objects. In response to successfully decrypting a crypt object, host processor 214 validates the corresponding service request. In addition, host processor 214 can provision narrow band-based network slices of a 5G network, such as 5G network slices 228 corresponding to 5G service provider 206, for edge devices to perform corresponding business functions based on the details of business functions received by host processor 214.

In response to host processor 214 validating a given service request, host processor 214 sends a nodal edge server activation request and the details of the business function to nodal orchestrator 216. Host server 210 utilizes nodal orchestrator 216 to determine whether a new or updated runtime binary is needed for a set of edge devices to perform the business function based on the details of the business function. Further, host server 210 utilizes nodal orchestrator 216 to migrate runtime binaries 222 to nodal edge servers. The nodal edge servers send runtime binaries 222 to associated edge devices to invoke the narrow band-based network slices of the 5G network for the edge devices to perform their corresponding business function transactions. Runtime binaries 222 are runtime configurations that obtain the resources needed by the edge devices to invoke the narrow band-based network slices of the 5G network and perform their corresponding business function transactions. Furthermore, host server 210 utilizes nodal state manager 218 to store state information of all runtime binaries stored on all nodal edge servers in the edge computing environment. Thus, host server 210 knows the state of a particular runtime binary loaded on a given nodal edge server at any given time.

Host server 210 utilizes nodal spawner 220 to generate and send runtime binary activation code to nodal edge servers for edge devices to perform the business function. In addition, nodal spawner 220 establishes network connections using a secure shell protocol with root access to operating systems of the nodal edge servers to execute the runtime binary activation code, which provides new capabilities to the nodal edge servers. Moreover, host server 210 can utilize nodal spawner 220 to add new virtual nodal edge servers as needed to perform business function transactions.

Nodal edge server 212 is an edge computer of the edge computing environment. Nodal edge server 212 manages operation of a set of edge devices to automatically perform a set of business functions. The set of edge devices automatically perform their corresponding set of business functions in accordance with their associated narrow band-based network slices of the 5G network. The set of edge devices invoke the narrow band-based network slices of the 5G network using a particular runtime binary provided by nodal edge server 212. Nodal edge server 212 utilizes nodal complement 224 to request needed runtime binaries for edge devices to perform corresponding business functions.

5G service provider broker 208 includes 5G service provider catalog 226. 5G service provider broker 208 utilizes 5G service provider catalog 226 to select the appropriate 5G service provider based on, for example, customer pricing, customer service level agreement, geographic location of service requests, geographic location of edge devices to perform business function transactions, and the like.

5G service provider 206 provides 5G network slices 228 of the 5G network to business function service provider 202 to perform business functions. 5G network slices 228 represent a plurality of narrow band-based network slices of the 5G network for edge devices to perform their corresponding business function transactions. A narrow band-based network slice has a specified start time, end time, and bandwidth of the 5G network. The set of edge devices associated with nodal edge server 212 has its own narrow band-based network slice to perform its corresponding business function and only that set of edge devices is able to access that particular narrow band-based network slice.

Figure 3:
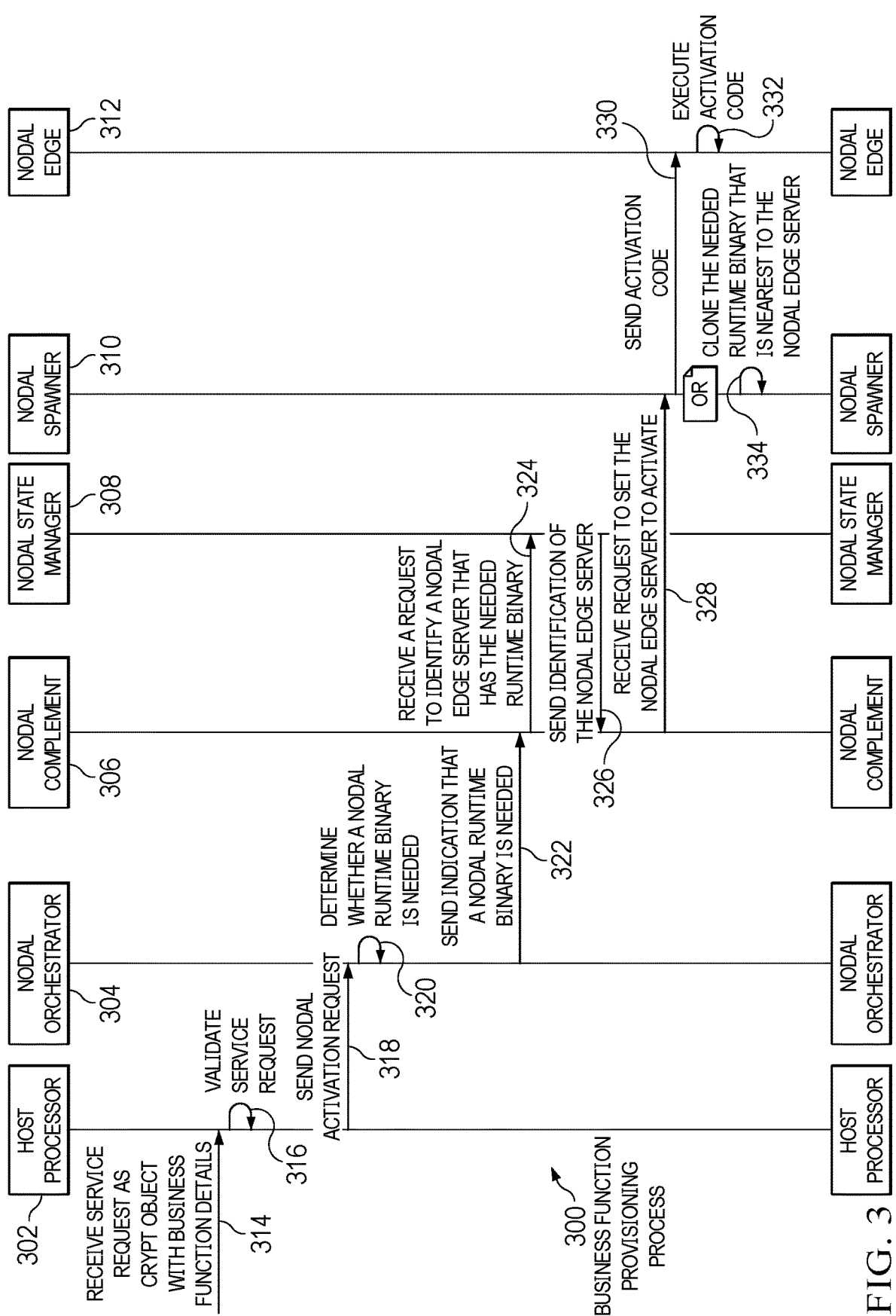
FIG. 3 is a diagram illustrating an example of a business function provisioning process in accordance with an illustrative embodiment.

With reference now to FIG. 3, a diagram illustrating an example of a business function provisioning process is depicted in accordance with an illustrative embodiment. Business function provisioning process 300 may be implemented in a business function provisioning system, such as, for example, business function provisioning system 201 in FIG. 2.

In this example, business function provisioning process 300 includes host processor 302, nodal orchestrator 304, nodal complement 306, nodal state manager 308, nodal spawner 310, and nodal edge server 312. Also, it should be noted that host processor 302, nodal orchestrator 304, nodal state manager 308, and nodal spawner 310 are components of a central host server, such as, for example, host processor 214, nodal orchestrator 216, nodal state manager 218, and nodal spawner 220 of host server 210 in FIG. 2. Nodal complement 306 is a component of nodal edge server 312 or an edge provisioning server.

At 314, host processor 302 receives a service request as a crypt object with details of a business function to be performed by a set of edge devices in the edge computing environment, which corresponds to host processor 302, from a client device of a user via a network. The client device may be, for example, end user device 103 in FIG. 1. The user may be a customer of the service provider of the business function, such as, for example, business function service provider 202 in FIG. 2. The network may be, for example, WAN 102 in FIG. 1.

At 316, host processor 302 validates the service request in response to successfully decrypting the crypt object with the details of the business function to be performed by the set of edge devices. At 318, in response to validating the service request, host processor 302 sends a nodal edge server activation request, along with the details of the business function, to nodal orchestrator 304. At 320, in response to receiving the nodal edge server activation request and details of the business function, nodal orchestrator 304 determines whether a new or updated runtime binary is needed for the set of edge devices to perform the business function based on the received details of the business function. In response to determining that a new or updated runtime binary is not needed (e.g., the current runtime binary corresponding to the business function is correct and up-to-date) for the set of edge devices to perform the business function, nodal orchestrator 304 migrates the current runtime binary corresponding to the business function from the host server to the set of edge devices via an associated nodal edge server.

At 322, in response to determining that a new or updated runtime binary is needed for the set of edge devices to perform the business function, nodal orchestrator 304 sends an indication that a nodal runtime binary is needed to nodal complement 306. At 324, nodal state manager 308 receives a request from nodal complement 306 to identify a nodal edge server that has the needed runtime binary in response to nodal complement 306 receiving the indication that the nodal runtime binary is needed for the set of edge devices to perform the business function. It should be noted that nodal state manager 308 stores the state of all runtime binaries on all nodal edge servers in the edge computing environment corresponding to the business function service provider.

At 326, nodal state manager 308 sends an identification of the nodal edge server that has the needed runtime binary for the set of edge devices to perform the business function to nodal complement 306. Nodal complement 306 interacts with nodal state manager 308 to obtain up-to-date information regarding which nodal edger server has the latest needed runtime binary for performing the business function. At 328, nodal spawner 310 receives from nodal complement 306 a request to set the nodal edge server that has the needed runtime binary to activate in response to nodal complement 306 receiving the identification of the nodal edge server. Nodal spawner 310 is a component of the host server for generating runtime binary activation code (e.g., new infrastructure as code for providing new capabilities) corresponding to the needed runtime binary at the nodal edge server when needed.

At 330, nodal spawner 310 activates and sends the runtime binary activation code to nodal edge server 312, which is the identified nodal edge server that has the needed runtime binary for the set of edge devices to perform the business function. In addition, at 332, nodal spawner 310 establishes a secure shell protocol connection with root operating system access to nodal edge server 312 and executes the runtime binary activation code. Alternatively, at 334, nodal spawner 310 can clone the needed runtime binary, which is nearest to nodal edge server 312, on nodal edge server 312 based on the details of the business function instead of performing 330 and 332 above.

Nodal state manager 308 records the state of nodal edge server 312 as deactivate in response to determining that the set of edge devices has finished performing the business function. Further, nodal orchestrator 304 deletes or removes the runtime binary loaded on nodal edge server 312 in response to the set of edge devices finishing performance of the business function.

For example, below is an exemplary implementation that evaluates the possibility of completing the business function transaction at the set of edge devices associated with the nodal edge server within the specified window of time at the specified bandwidth.

$S$ Set of virtualized services across all cloud fabric, (1)

where $S=\{s_1, s_2, \ldots, s_i, \ldots, s_k, \ldots, s_{|S|}\}$.

$P$ Set of runtime binary partitions, where $P=$
$p_1, p_2, \ldots, p_j, \ldots, p_{|P|}$. (2)

$p_j$ $|p_j|$ is the size of runtime binary partition.
$C^I$ $|S| \times |P|$ matrix representing an initial configuration, where, $$C_{i,j}^I = \begin{cases} 1 \text{ if runtime binary of } p_j \text{ is stored on } s_i \\ 0, \text{ otherwise} \end{cases} \quad (3)$$

$|S| \times |P|$ matrix representing a final configuration, $C^F$ where, $$C_{i,j}^F = \begin{cases} 1 \text{ if runtime binary of } p_j \text{ is stored on } s_i \\ 0, \text{ otherwise} \end{cases} \quad (4)$$

Variable Definitions:

Y |S|×|P|×|S| matrix representing a need for runtime binary partition migration, where, $$y_{i,j,k} = \begin{cases} 1 & s_i \text{ is provider of runtime binary of } p_j \text{ to } s_k \\ 0, & \text{otherwise} \end{cases} \quad (5)$$

D |S|×|P| matrix representing the runtime binaries that are to be mobilized at time T, where, $$d_{i,j} = \begin{cases} 1 & s_i \text{ has runtime binary of } p_j \text{ will be deleted from } s_i \\ 0, & \text{otherwise} \end{cases} \quad (6)$$

Illustrative embodiments achieve activation of the business function by making a change to the required state of a business function, which is referred to as the configuration of the runtime binary. If a virtualized nodal edge server $s_k$ has a runtime binary of partition $p_j$ in the initial and final configuration and no action is required, then there should be no migration of the runtime binary of partition $p_j$ from any virtualized nodal edger server $s_i$ to $s_k$. This is formulated as:

$$\{\Sigma_{i=1}^{|S|} y_{i,j,k} = 0, d_{i,j} = 0\}_{(s_k, p_j)}. \quad (7)$$

Otherwise, from Equation (7), illustrative embodiments get the complement, setting up the scenario where replication or cloning is needed, as:

$$\{[C_{k,j}^I + \Sigma_{i=1}^{|S|} y_{i,j,k} - d_{i,j} = C_{k,j}^F], [d_{i,j} > C_{k,j}^F - C_{k,j}^I]\} \quad (8)$$
$$\forall 1 \le k \le |S|, 1 \le j \le |P|.$$

There are some virtualized nodal edge servers $s_i$ that migrate the runtime binary of partition $p_j$ to nodal edge server $s_k$, as:

$$\left\{ \sum_{i=1}^{|S|} y_{i,j,k} = 1 \right\}_{(s_k, p_j)}. \quad (9)$$

Illustrative embodiments capture the need for a runtime binary migration when the nodal edge server $s_k$ does not have the runtime binary of partition $p_j$ in the initial configuration, as:

$$\left\{ \sum_{i=1}^{|S|} y_{i,j,k} \ge C_{k,j}^F - C_{k,j}^I \right\}_{\forall 1 \le k \le |S|, 1 \le j \le |P|}. \quad (10)$$

This activation is the proof of setting up a valid access that fulfills the customer demand that is outside the scope of the service catalog. Illustrative embodiments identify the services through the 5G service provider broker, which is invoked on the host server, and, in response, the host server ensures that fulfillment of the virtualized business function $C_{k,j}^F$ is provisioned near the invoking third party requestor.

Figure 4B:
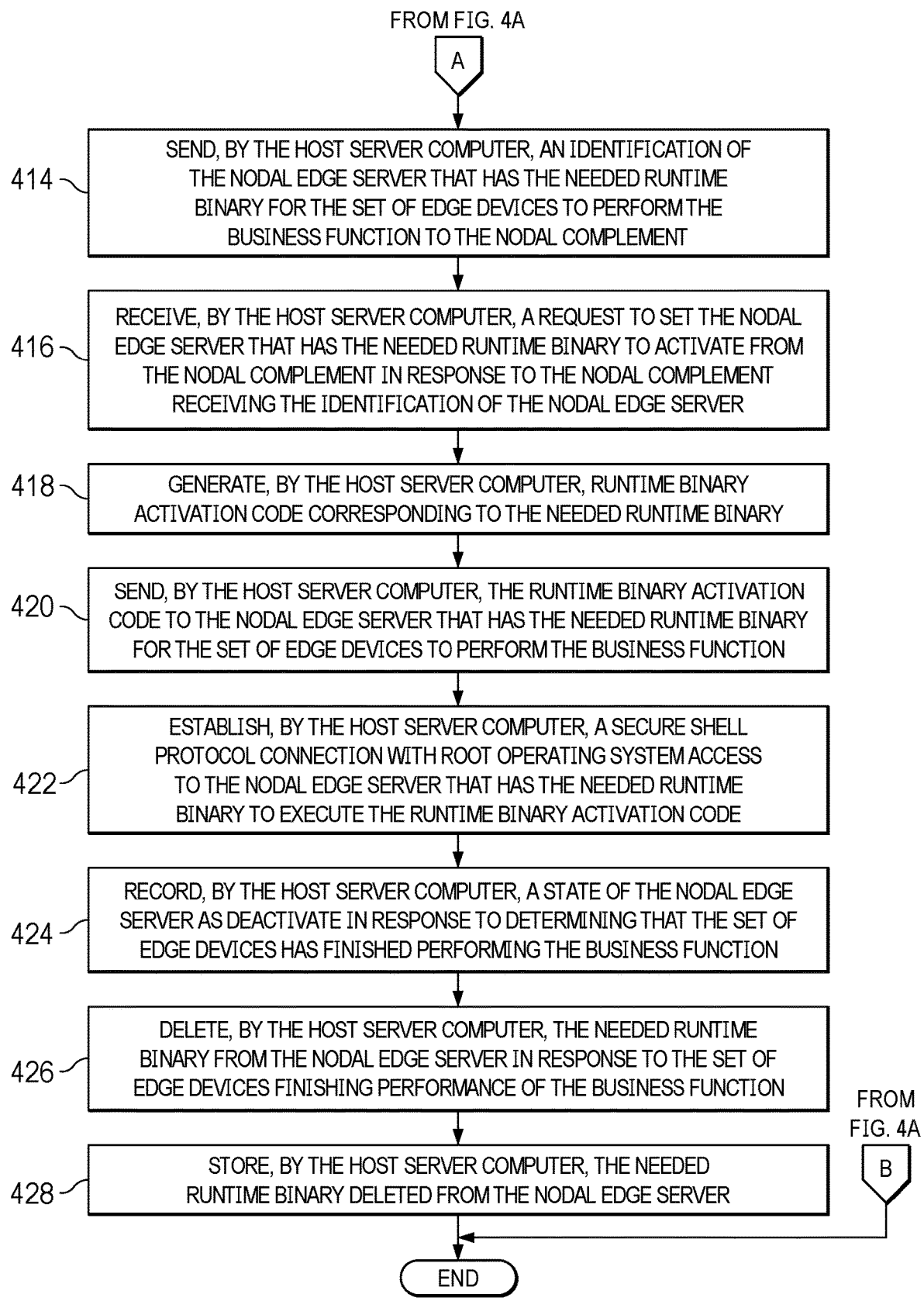

With reference now to FIGS. 4A-4B, a flowchart illustrating a process for provisioning business functions is shown in accordance with an illustrative embodiment. The process shown in FIGS. 4A-4B may be implemented in a host server computer, such as, for example, computer 101 in FIG. 1 or host server 210 in FIG. 2. For example, the process shown in FIGS. 4A-4B may be implemented in business function provisioning code 200 in FIG. 1.

The process begins when the host server computer receives a service request as a crypt object with details of a business function to be performed by a set of edge devices in an edge computing environment corresponding to the host server computer from a client device of a user via a network (step 402). The host server computer validates the service request in response to successfully decrypting the crypt object with the details of the business function to be performed by the set of edge devices (step 404).

Afterward, the host server computer makes a determination as to whether one of a new runtime binary or an updated runtime binary is needed for the set of edge devices to perform the business function based on the details of the business function (step 406). If the host server computer determines that a new runtime binary or an updated runtime binary is not needed for the set of edge devices to perform the business function based on the details of the business function, no output of step 406, then the host server computer migrates a current runtime binary corresponding to the business function to the set of edge devices via an associated nodal edge server (step 408). Thereafter, the process terminates. If the host server computer determines that one of a new runtime binary or an updated runtime binary is needed for the set of edge devices to perform the business function based on the details of the business function, yes output of step 406, then the host server computer sends an indication that a runtime binary is needed to a nodal complement of an edge provisioning server (step 410).

Subsequently, the host server computer receives a request from the nodal complement to identify a nodal edge server that has the needed runtime binary in response to the nodal complement receiving the indication that the runtime binary is needed for the set of edge devices to perform the business function (step 412). The host server computer stores a state of each respective runtime binary loaded on each respective nodal edge server in the edge computing environment. The host server computer sends an identification of the nodal edge server that has the needed runtime binary for the set of edge devices to perform the business function to the nodal complement (step 414).

The host server computer receives a request to set the nodal edge server that has the needed runtime binary to activate from the nodal complement in response to the nodal complement receiving the identification of the nodal edge server (step 416). In response to receiving the request, the host server computer generates runtime binary activation code corresponding to the needed runtime binary (step 418). The host server computer sends the runtime binary activation code to the nodal edge server that has the needed runtime binary for the set of edge devices to perform the business function (step 420). In addition, the host server computer establishes a secure shell protocol connection with root operating system access to the nodal edge server that has the needed runtime binary to execute the runtime binary activation code (step 422).

Subsequently, the host server computer records a state of the nodal edge server as deactivate in response to determining that the set of edge devices has finished performing the business function (step 424). Further, the host server computer deletes the needed runtime binary from the nodal edge server in response to the set of edge devices finishing performance of the business function (step 426). Furthermore, the host server computer stores the needed runtime binary deleted from the nodal edge server on the host server computer (step 428). Thereafter, the process terminates.

Thus, illustrative embodiments of the present invention provide a computer-implemented method, computer system, and computer program product for provisioning and executing a virtualized business function on an edge computing environment by providing runtime binaries on the edge. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for provisioning business functions, the computer-implemented method comprising:

sending, by a computer, a runtime binary activation code to a nodal edge server that has a needed runtime binary for a set of edge devices to perform a business function, wherein the needed runtime binary is a runtime configuration that obtains resources needed by the set of edge devices to invoke a narrow band-based network slice of a fifth-generation (5G) network and perform the business function, wherein the resources include a set of services;

determining, by the computer, whether one of a new runtime binary or an updated runtime binary is needed for the set of edge devices to perform the business function based on details of the business function;

responsive to the computer determining that one of a new runtime binary or an updated runtime binary is needed for the set of edge devices to perform the business function based on the details of the business function, sending, by the computer, an indication that a runtime binary is needed to a nodal complement that is a component of an edge provisioning server;

receiving, by the computer, a request from the nodal complement to identify the nodal edge server that has the needed runtime binary in response to the nodal complement receiving the indication that the runtime binary is needed for the set of edge devices to perform the business function;

establishing, by the computer, a secure shell protocol connection with root operating system access to the nodal edge server that has the needed runtime binary to execute the runtime binary activation code;

detecting that the set of edge devices has finished performing the business function; and deleting, by the computer, the needed runtime binary from the nodal edge server in response to the set of edge devices finishing performance of the business function.

2. The computer-implemented method of claim 1 further comprising:

receiving, by the computer, a request to set the nodal edge server that has the needed runtime binary to activate from a nodal complement in response to the nodal complement receiving an identification of the nodal edge server; and generating, by the computer, the runtime binary activation code corresponding to the needed runtime binary in response to receiving the request to set the nodal edge server that has the needed runtime binary to activate.

3. The computer-implemented method of claim 1 further comprising:

receiving, by the computer, a service request as a crypt object with details of the business function to be performed by the set of edge devices in an edge computing environment corresponding to the computer from a client device of a user via a network; and validating, by the computer, the service request in response to successfully decrypting the crypt object with the details of the business function to be performed by the set of edge devices.

4. The computer-implemented method of claim 1 further comprising:

sending, by the computer, an identification of the nodal edge server that has the needed runtime binary for the set of edge devices to perform the business function to the nodal complement.

5. The computer-implemented method of claim 4 further comprising:

responsive to the computer determining that a new runtime binary or an updated runtime binary is not needed for the set of edge devices to perform the business function based on the details of the business function, migrating, by the computer, a current runtime binary corresponding to the business function to the set of edge devices via an associated nodal edge server.

6. The computer-implemented method of claim 1 further comprising:

recording, by the computer, a state of the nodal edge server as deactivate in response to determining that the set of edge devices has finished performing the business function;

and storing, by the computer, the needed runtime binary deleted from the nodal edge server on the computer.

7. The computer-implemented method of claim 1, wherein the computer stores a state of each respective runtime binary loaded on each respective nodal edge server in an edge computing environment corresponding to the computer.

8. The computer-implemented method of claim 1, wherein the narrow band-based network slice of the 5G network is comprised of a specified start time, end time, and bandwidth, and wherein only the set of devices can access the narrow band-based network slice of the 5G network to perform the business function.

9. The computer-implemented method of claim 1, wherein the business function is associated with an ultra-low latency application.

10. A computer system for provisioning business functions, the computer system comprising:

a communication fabric;

a storage device connected to the communication fabric, wherein the storage device stores program instructions; and a processor connected to the communication fabric, wherein the processor executes the program instructions to:

send a runtime binary activation code to a nodal edge server that has a needed runtime binary for a set of edge devices to perform a business function, wherein the needed runtime binary is a runtime configuration that obtains resources needed by the set of edge devices to invoke a narrow band-based network slice of a fifth-generation (5G) network and perform the business function, wherein the resources include a set of services;

determine whether one of a new runtime binary or an updated runtime binary is needed for the set of edge devices to perform the business function based on details of the business function;

send an indication that a runtime binary is needed to a nodal complement that is a component of an edge provisioning server in response to determining that one of a new runtime binary or an updated runtime binary is needed for the set of edge devices to perform the business function based on the details of the business function;

receive a request from the nodal complement to identify the nodal edge server that has the needed runtime binary in response to the nodal complement receiving the indication that the runtime binary is needed for the set of edge devices to perform the business function;

establish a secure shell protocol connection with root operating system access to the nodal edge server that has the needed runtime binary to execute the runtime binary activation code;

detecting that the set of edge devices has finished performing the business function; and deleting, by the computer, the needed runtime binary from the nodal edge server in response to the set of edge devices finishing performance of the business function.

11. The computer system of claim 10, wherein the processor further executes the program instructions to:

receive a request to set the nodal edge server that has the needed runtime binary to activate from a nodal complement in response to the nodal complement receiving an identification of the nodal edge server; and generate the runtime binary activation code corresponding to the needed runtime binary in response to receiving the request to set the nodal edge server that has the needed runtime binary to activate.

12. The computer system of claim 10, wherein the processor further executes the program instructions to:

receive a service request as a crypt object with details of the business function to be performed by the set of edge devices in an edge computing environment corresponding to the computer system from a client device of a user via a network; and validate the service request in response to successfully decrypting the crypt object with the details of the business function to be performed by the set of edge devices.

13. The computer system of claim 10, wherein the processor further executes the program instructions to:

send an identification of the nodal edge server that has the needed runtime binary for the set of edge devices to perform the business function to the nodal complement.

14. The computer system of claim 13, wherein the processor further executes the program instructions to:

migrate a current runtime binary corresponding to the business function to the set of edge devices via an associated nodal edge server in response to determining that a new runtime binary or an updated runtime binary is not needed for the set of edge devices to perform the business function based on the details of the business function.

15. A computer program product for provisioning business functions, the computer program product comprising a computer-readable storage medium having program instructions embodied therewith, the program instructions executable by a computer to cause the computer to perform a method of:

sending, by the computer, a runtime binary activation code to a nodal edge server that has a needed runtime binary for a set of edge devices to perform a business function, wherein the needed runtime binary is a runtime configuration that obtains resources needed by the set of edge devices to invoke a narrow band-based network slice of a fifth-generation (5G) network and perform the business function, wherein the resources include a set of services;

determining, by the computer, whether one of a new runtime binary or an updated runtime binary is needed for the set of edge devices to perform the business function based on details of the business function;

responsive to the computer determining that one of a new runtime binary or an updated runtime binary is needed for the set of edge devices to perform the business function based on the details of the business function, sending, by the computer, an indication that a runtime binary is needed to a nodal complement that is a component of an edge provisioning server;

receiving, by the computer, a request from the nodal complement to identify the nodal edge server that has the needed runtime binary in response to the nodal complement receiving the indication that the runtime binary is needed for the set of edge devices to perform the business function;

establishing, by the computer, a secure shell protocol connection with root operating system access to the nodal edge server that has the needed runtime binary to execute the runtime binary activation code;

detecting that the set of edge devices has finished performing the business function; and deleting, by the computer, the needed runtime binary from the nodal edge server in response to the set of edge devices finishing performance of the business function.

16. The computer program product of claim 15 further comprising:

receiving, by the computer, a request to set the nodal edge server that has the needed runtime binary to activate from a nodal complement in response to the nodal complement receiving an identification of the nodal edge server; and generating, by the computer, the runtime binary activation code corresponding to the needed runtime binary in response to receiving the request to set the nodal edge server that has the needed runtime binary to activate.

17. The computer program product of claim 15 further comprising:

receiving, by the computer, a service request as a crypt object with details of the business function to be performed by the set of edge devices in an edge computing environment corresponding to the computer from a client device of a user via a network; and validating, by the computer, the service request in response to successfully decrypting the crypt object with the details of the business function to be performed by the set of edge devices.

18. The computer program product of claim 15 further comprising:

sending, by the computer, an identification of the nodal edge server that has the needed runtime binary for the set of edge devices to perform the business function to the nodal complement.

19. The computer program product of claim 18 further comprising:

responsive to the computer determining that a new runtime binary or an updated runtime binary is not needed for the set of edge devices to perform the business function based on the details of the business function, migrating, by the computer, a current runtime binary corresponding to the business function to the set of edge devices via an associated nodal edge server.

* * * * *